United States Patent
Daloia (10) Patent No.: US 12,188,804 B2
(45) Date of Patent: *Jan. 7, 2025

(54) DETERMINING A CHANGE IN VOLUME OF FLUID ADDED OR REMOVED FROM A VESSEL

(71) Applicant: Chad Daloia, Washington, PA (US)

(72) Inventor: Chad Daloia, Washington, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/832,810

(22) Filed: Jun. 6, 2022

(65) Prior Publication Data

US 2024/0175737 A1    May 30, 2024

Related U.S. Application Data (63) Continuation of application No. 16/702,682, filed on Dec. 4, 2019, now Pat. No. 11,353,353.

(60) Provisional application No. 62/781,071, filed on Dec. 18, 2018.

(51) Int. Cl.
| | |
|---|---|
| G01F 22/00 | (2006.01) |
| B60P 3/22 | (2006.01) |
| G01C 9/02 | (2006.01) |
| G01F 23/284 | (2006.01) |

(52) U.S. Cl.
CPC ............ *G01F 22/00* (2013.01); *B60P 3/228* (2013.01); *G01C 9/02* (2013.01); *G01F 23/284* (2013.01)

(58) Field of Classification Search
None
See application file for complete search history.

(56) References Cited

U.S. PATENT DOCUMENTS

| | | | | |
|---|---|---|---|---|
| 4,258,422 A * | 3/1981 | Dougherty | ............... | G01F 17/00 73/304 C |
| 4,815,323 A * | 3/1989 | Ellinger | ............... | G01F 23/2962 702/54 |
| 5,138,559 A * | 8/1992 | Kuehl | ............... | G01F 23/804 73/292 |
| 6,615,656 B1 * | 9/2003 | Breed | ............... | G01F 23/36 177/136 |
| 2007/0157718 A1 * | 7/2007 | Woodard | ............... | G01F 23/268 73/304 R |
| 2015/0100253 A1 * | 4/2015 | Austerlitz | ............... | G01F 22/00 702/55 |
| 2019/0003870 A1 * | 1/2019 | Quartarone | ............... | B64D 37/005 |
| 2020/0191635 A1 * | 6/2020 | Daloia | ............... | B60P 3/228 |

* cited by examiner

*Primary Examiner* — Patrick Assouad
*Assistant Examiner* — Mark A Shabman
(74) *Attorney, Agent, or Firm* — Michael D. Lazzara; Leech Tishman Fuscaldo & Lampl (57) ABSTRACT

The present invention relates to a method and apparatus (5) for determining a change in volume within a vessel (11) with regard to fluid (14) being added or removed from the vessel. The method involves measuring first and second surface levels (20, 20') of fluid (14) within the vessel (11) (with regard to fluid being added or removed therefrom), first and second roll values (23, 23') of the vessel, and first and second pitch values (26, 26') of the vessel. From these measurements, and in conjunction with the known interior dimensions and known interior total volume of the vessel, there are calculated first and second fluid volumes that are compared to determine a change in fluid within the vessel.

15 Claims, 2 Drawing Sheets

DETERMINING A CHANGE IN VOLUME OF FLUID ADDED OR REMOVED FROM A VESSEL

CROSS REFERENCE TO RELATED APPLICATION

The present application is entitled to and claims priority as a Continuation of U.S. patent application Ser. No. 16/702,682, filed on Dec. 4, 2019, which claims priority to U.S. Provisional Patent Application No. 62/781,071, filed on Dec. 18, 2018, the disclosures of which are incorporated herein by reference in their entirety.

FIELD

The present invention relates to a method and apparatus for determining a change in volume within a vessel with regard to fluid being added or removed therefrom, which involves measuring first and second surface levels of fluid within the vessel, first and second roll values of the vessel, and first and second pitch values of the vessel, from which are calculated first and second fluid volumes that are compared to determine a change in fluid within the vessel.

BACKGROUND

Fluid containing vessels, such as vessels (or fluid tanks) supported on a vehicle such as a truck, are typically statically positioned when fluid is added or removed from the vessel. In some instances, fluid is removed from the vessel by introducing a gas, such as air, at an elevated pressure into the interior of the vessel. In some instances, fluid is added to the vessel by reducing pressure within the vessel, thereby causing fluid from a source to drawn within the vessel from a fluid source through a conduit. The vessel may not be positioned horizontally when the fluid is added or removed therefrom. As such, measuring initial and subsequent fluid levels within the vessel, when the vessel is not horizontal, can provide an incorrect indication of the initial and subsequent volumes of fluid contained therein, and correspondingly an incorrect determination of the change in volume of fluid within the vessel after fluid has been added or removed therefrom.

It would be desirable to develop new methods and apparatuses that can provide an accurate determination of the change in volume of fluid within a vessel, when fluid is added or removed therefrom.

SUMMARY

In accordance with the present invention, there is provided a method, of determining a volume of fluid within a vessel, comprising:
- (a) providing a vessel (11) having known interior dimensions, and having a known interior total volume, wherein the vessel is supported on a base (17);
- (b) measuring a first surface level (20) of fluid within the vessel;
- (c) measuring a first roll value (23) of the vessel;
- (d) measuring a first pitch value (26) of the vessel;
- (e) calculating a first volume of fluid within the vessel using the know interior dimensions of the vessel, the known interior total volume of the vessel, the first surface level of fluid within the vessel, the first roll value of the vessel, and the first pitch value of the vessel;
- (f) adding fluid to the vessel or removing fluid from the vessel;
- (g) measuring a second surface level (20') of fluid within the vessel;
- (h) measuring a second roll value (23') of the vessel;
- (i) measuring a second pitch value (26') of the vessel;
- (j) calculating a second volume of fluid within the vessel using the know interior dimensions of the vessel, the known interior total volume of the vessel, the second surface level of fluid within the vessel, the second roll value of the vessel, and the second pitch value of the vessel; and
- (k) comparing the first volume of fluid within the vessel and the second volume of fluid within the vessel, thereby determining a change in volume of fluid within the vessel.

In further accordance with the present invention there is also provided an apparatus (5) for determining a change in volume of fluid within a vessel (11) comprising:
- (a) a fluid level detector (29) that detects fluid levels within the vessel (11), wherein the vessel has known interior dimensions, has a known interior total volume, and the vessel is supported on a base (17);
- (b) a tilt sensor (41) having an x-y plane (50, 53), wherein the base (17) has an x-y plane (44, 47), and the tilt sensor is positioned such that the x-y plane (44, 47) of the base (17) and the x-y plane (50, 53) of the tilt sensor (41) are parallel to each other, the tilt sensor (41) providing a first roll value (23) of the vessel, a second roll value (23') of the vessel, a first pitch value (26) of the vessel, and a second pitch value (26') of the vessel; and
- (c) a computing device (62) comprising at least one input interface (65, 68), at least one output interface (71), a database comprising the known interior dimensions of the vessel and the known interior total volume of the vessel, and a software program that calculates volume of fluid within the vessel;

wherein the fluid level detector (29) is communicatively connected (e.g., via communicative connection 83) to at least one input interface (e.g., 65) of the computing device (62), and the tilt sensor (41) is communicatively connected (e.g., via communicative connection 80) to at least one input interface (e.g., 68) of the computing device (62), wherein a first surface level (20) of fluid (14) within the vessel (11) is communicated (e.g., via communicative connection 83) from the fluid level detector (29) to at least one input interface (e.g., 65) of the computing device (62), a first roll value (23) of the vessel is communicated (e.g., via communicative connection 80) from the tilt sensor (41) to at least one input interface (e.g., 68) of the computing device (62), and a first pitch value (26) is communicated (e.g., via communicative connection 80) from the tilt sensor (41) to at least one input interface (e.g., 68) of the computing device (62), wherein the software program calculates a first volume of fluid within the vessel using the know interior dimensions of the vessel, the known interior total volume of the vessel, the first surface level (20) of the fluid (14) within the vessel, the first roll value (23) of the vessel, and the first pitch value (26) of the vessel, wherein fluid (14) is removed from the vessel (11), or fluid (14) is added to the vessel (11), wherein a second surface level (20') of fluid (14) within the vessel (11) is communicated (e.g., via communicative connection 83) from the fluid level detector (29) to at least one input interface (e.g., 65) of the computing device (62), a second roll value (23') of the vessel is communicated (e.g., via communicative connection 80) from the tilt sensor (41) to at least one input interface (e.g., 68) of the computing device (62), and a second pitch value (26') is communicated (e.g., via communicative connection 80) from the tilt sensor (41) to at least one input interface (e.g., 68) of the computing device (62), wherein the software program calculates a second volume of fluid within the vessel using the know interior dimensions of the vessel, the known interior total volume of the vessel, the second surface level (20') of the fluid within the vessel, the second roll value (23') of the vessel, and the second pitch value (26') of the vessel, and wherein, with the software program, the first volume of fluid within the vessel and the second volume of fluid within the vessel are compared, and thereby the change in volume of fluid within the vessel is determined.

The features that characterize the present invention are pointed out with particularity in the claims, which are annexed to and form a part of this disclosure. These and other features of the invention, its operating advantages and the specific objects obtained by its use will be more fully understood from the following detailed description in which non-limiting embodiments of the invention are illustrated and described.

BRIEF DESCRIPTION OF THE DRAWINGS

In FIGS. 1 and 2 like characters refer to the same elements and/or components, as the case may be, unless otherwise stated.

DETAILED DESCRIPTION

As used herein, the articles "a," "an," and "the" include plural referents unless otherwise expressly and unequivocally limited to one referent.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

As used herein, spatial or directional terms, such as "left", "right", "inner", "outer", "above", "below", and the like, relate to the invention as it is depicted in the drawing figures. It is to be understood, however, that the invention can assume various alternative orientations and, accordingly, such terms are not to be considered as limiting.

As used herein, the term "roll value" means a roll angle or a roll degree (or degree of roll), which can be determined relative to horizontal, and can be provided as degrees, radians, or percent.

As used herein, the term "pitch value" means a pitch angle or a pitch degree (or degree of pitch), which can be determined relative to horizontal, and can be provided as degrees, radians, or percent.

As used herein, the term "hydrofracture" relates to hydraulic fracturing. As used herein the term "hydrofracture wastewater" means wastewater that results from hydraulic fracturing processes. As used herein, the term "hydrofracture flowback water" means flowback water that results from hydraulic fracturing processes. As used herein, the term "hydrofracture production (or produced) water" means production (or produced) water that results from hydraulic fracturing processes.

As used herein, the term "lotic water" means flowing surface water, including, but not limited to, spring water, stream water, and/or river water.

As used herein, the term "computing device" refers to one or more electronic devices configured to process data. A computing device, in accordance with some embodiments, includes the necessary components to receive, process, and output data, such as a display, a processor, a memory, an input device, and a network interface. An example of a computing device includes, but is not limited to, a computer processing unit, and/or a mobile device. Examples of mobile devices include, but are not limited to: a cellular phone (e.g., a smartphone or standard cellular phone); a portable computer; a wearable device (e.g., watches, glasses, lenses, clothing, and/or the like); a personal digital assistant (PDA); and/or other like devices. A further example of a computing device includes, but is not limited to, a desktop computer or other form of non-mobile computer. An "Application Programing Interface" (API) refers to computer code or other data stored on a computer-readable medium that can be executed by a processor to facilitate the interaction between software components, such as a client-side front-end and/or server-side back-end for receiving data from the client. An "interface" refers to a generated display, such as one or more graphical user interfaces (GUIs) with which a user (such as a human user) can interact, either directly or indirectly (such as, visually, through a keyboard, mouse, etc.).

As used herein, the term "communication" refers to the reception, receipt, transmission, transfer, provision, and/or the like, of data (including, but not limited to, information, signals, messages, instructions, commands, and/or the like). For one unit (such as, a device, a system, a component of a device or system, combinations thereof, and/or the like) to be in communication with (or communicatively connected to) another unit means that the one unit is able to directly or indirectly receive information from and/or transmit information to the other unit. This can involve a direct or indirect connection (such as, a direct communicative connection, an indirect communicative connection, and/or the like) that is wired (e.g., electrically wired), fiber optic, and/or wireless in nature. Additionally, two units can be in communication with (or communicatively connected to) each other even though the information transmitted is modified, processed, relayed, and/or routed between the first and second unit. For purposes of non-limiting illustration, a first unit can be in communication with a second unit even though the first unit passively receives information and does not actively transmit information to the second unit. As another non-limiting example, a first unit can be in communication with a second unit if at least one intermediary unit processes information received from the first unit and communicates the processed information to the second unit.

All documents, such as but not limited to issued patents and patent applications, referred to herein, and unless otherwise indicated, are to be considered to be "incorporated by reference" in their entirety.

The first and second surface levels of the fluid within the vessel, with some embodiments can be measured manually, such as with a ruler extending down into the vessel and below the surface level of the fluid therein. The method of the present invention, with some embodiments, involves measuring a plurality of first and second fluid levels, such as in conjunction with a plurality of fluid additions to and/or fluid removals from the vessel. The method of the present invention, with some further embodiments, involves continuously measuring a plurality of first and second fluid levels, such as in conjunction with a plurality of fluid additions to and/or fluid removals from the vessel, which can in each case be conducted continuously.

Figure 1:
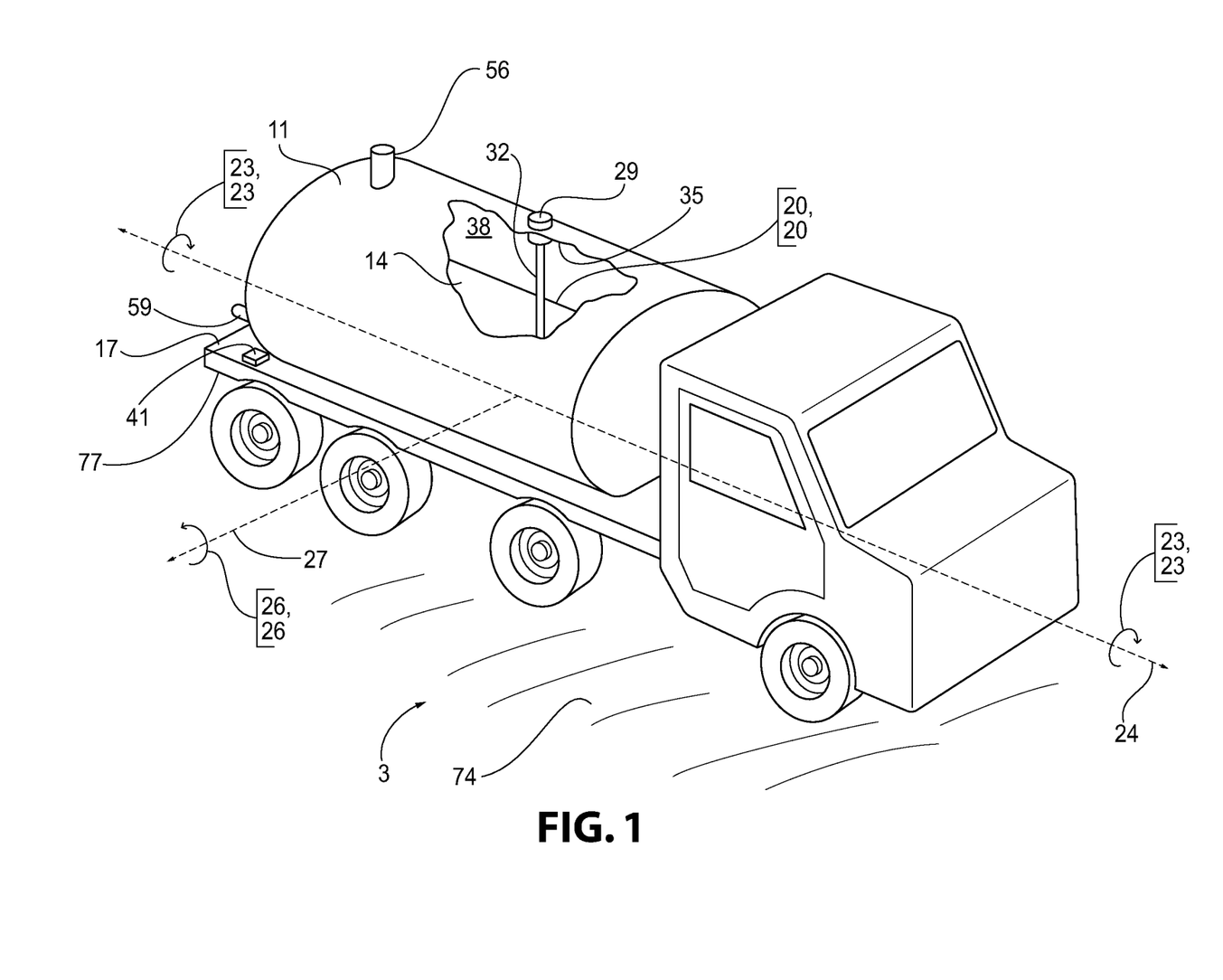
FIG. 1 is a representative perspective view of a truck (3) that includes a vessel (11) supported on a base (17), in which a portion of the vessel (11) is partially cut away.
Figure 2:
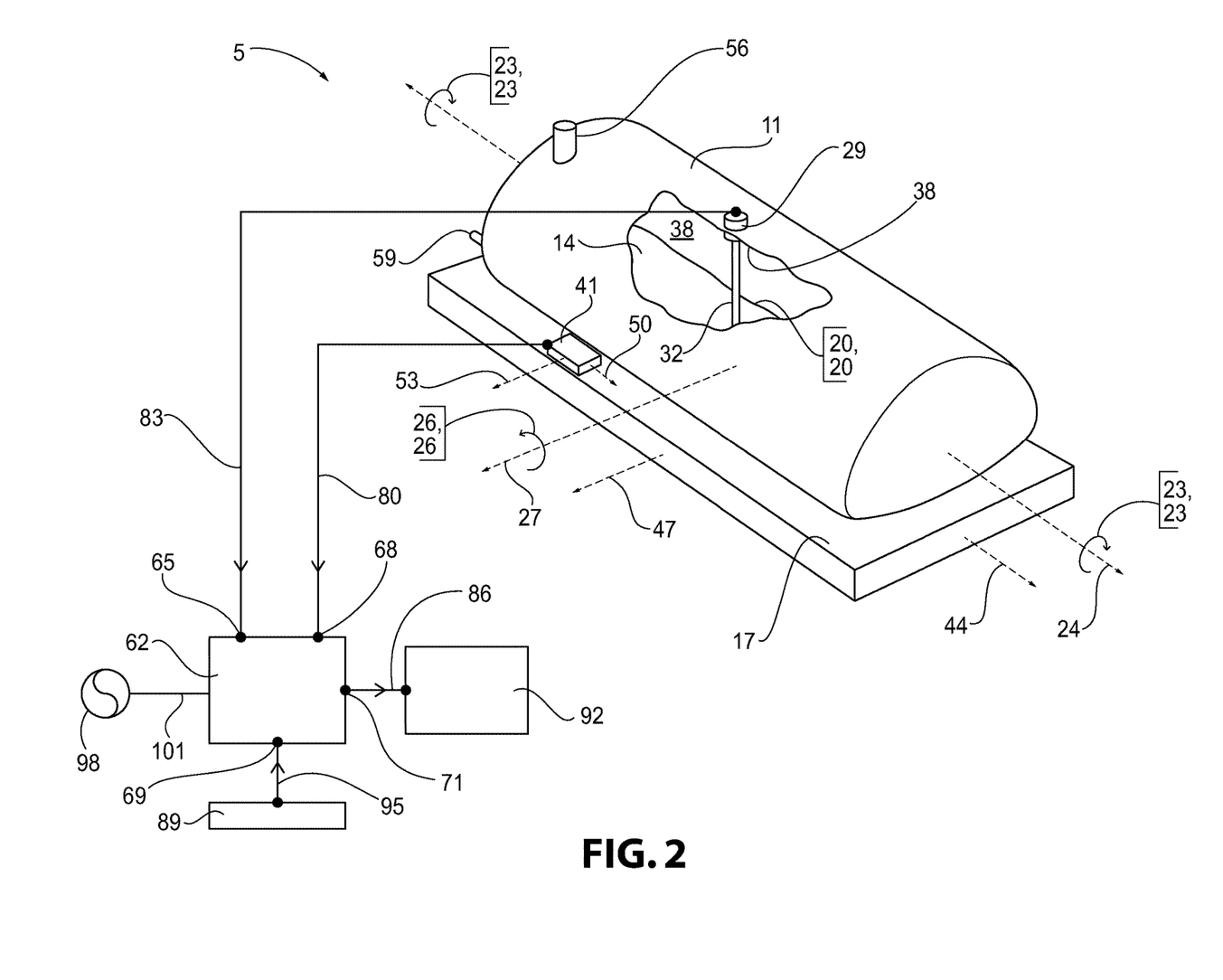
FIG. 2 is a representative schematic and perspective view of a vessel (11) that is partially cut away and supported on a base (17) that includes an apparatus (5) according to the present invention.

With reference to FIGS. 1 and 2 of the drawings, and in accordance with some embodiments of the present invention, the first surface level (20) of the fluid (14) within the vessel (11), and the second surface level (20') of the fluid within the vessel (11), are each measured with a fluid level detector (29). Classes of fluid level detectors include, but are not limited to, contact fluid level detectors and non-contact fluid level detectors. Examples of contact fluid level detectors include, but are not limited to, float level gauges, and guided wave radar devices (such as guided microwave devices). Examples of non-contact fluid level detectors include, but are not limited to, non-contact radar fluid level detectors (such as, non-contact microwave fluid level detectors).

With some embodiments of the present invention, the first surface level of fluid within the vessel, and the second surface level of fluid within the vessel, are each independently measured with a fluid level detector selected from a contact fluid level detector, a non-contact fluid level detector, or combinations thereof.

In accordance with some further embodiments of the present invention, the first surface level of fluid within the vessel, and the second surface level of fluid within the vessel, are each independently measured with a fluid level detector that is selected from a non-contact microwave fluid level detector.

With some embodiments, the fluid level detector (29) is a wave radar device (29) that includes a waveguide (32) that extends from an interior upper surface (35) of the vessel (11) into an interior (38) of the vessel (11). The waveguide (32) extends into the fluid (14) within the vessel (11) and provides the first surface level (20) and the second surface level (20') of the fluid (14) within the vessel (11).

With some further embodiments, the guided wave radar device (29) is stationary and includes a waveguide (32) that extends from an interior upper surface (35) of the vessel (11) into an interior (38) of the vessel (11) and into the fluid (14) within the vessel. The waveguide, with some embodiments, extends partially down below the surface level of the fluid, such that the bottom of the waveguide resides above the bottom interior surface of the vessel. With some further embodiments, the waveguide extends down to and is in contact with the bottom interior surface of the vessel.

In accordance with some further embodiments of the present invention, the fluid level detector (29) is a non-contact radar fluid level detector, such as, a non-contact microwave fluid level detector, which does not include the waveguide (32). For purposes of non-limiting illustration, when the fluid level detector (29) is a non-contact microwave fluid detector, microwaves are transmitted from fluid level detector (29) down into interior (38) of vessel (11), which in effect bounce or reflect off of the fluid surface (20, 20'), and are received by fluid level detector (29). With some embodiments, the time delay between transmission of microwaves and receipt of bounced or reflected microwaves is processed by fluid level detector (29) so as to provide a level (such as first or second fluid level, 20, 20') of fluid within vessel (11).

The fluid level detector (29) can, with some embodiments, be placed anywhere along an upper portion of vessel (11). With some embodiments, fluid level detector (29) is placed anywhere along an upper portion of vessel (11) and in alignment with the longitudinal axis (24) of vessel (11), which can be referred to as being positioned along the spine of vessel (11). In accordance with some further embodiments, the fluid level detector (29) is positioned over a lowest point (or deepest point) of interior (38) of vessel (11). In accordance with some embodiments, the position of fluid level detector (29) is fixed while the surface level of fluid within vessel (11) is measured. With some further embodiments of the method and apparatus of the present invention, the position of fluid level detector (29) is taken into consideration when calculating and determining the volume of fluid within vessel (11).

The first and second roll values (23, 23') and the first and second pitch values (26, 26') of the vessel (11) are, with some embodiments, determined manually, such as using one or two levels, such one or two a spirit levels (or bubble levels).

With reference to FIGS. 1 and 2 of the drawings, the first and second roll values (23, 23') are determined along axis (24) and the first and second pitch values (26, 26') are determined along axis (27), where axis (24) and axis (27) are orthogonal to each other.

In accordance with some embodiments, the first and second roll values (23, 23') of the vessel (11) and the first and second pitch values (26, 26') of the vessel are each measured with at least one tilt sensor (or tilt indicator) (41). Examples of tilt sensors/indicators that can be used with the present invention include, but are not limited to, spirit levels, inclinometers, and accelerometers.

With some embodiments, the base (17) has an x-y plane (44, 47), and the tilt sensor (41) has an x-y plane (50, 53), and the x-y plane (44, 47) of the base (17) and the x-y plane (50, 53) of the tilt sensor (41) are parallel to each other.

The tilt sensor, with some embodiments, is attached to any appropriate surface, provided that the x-y plane (44, 47) of the base (17) and the x-y plane (50, 53) of the inclinometer (41) are parallel to each other. In accordance with some embodiments of the present invention, the tilt sensor (41) is attached to the base (17). With some embodiments, the first and second roll values and the first and second pitch values of the base (17) are equivalent to the first and second roll values (23, 23') and the first and second pitch values (26, 26') of the vessel (11).

With some embodiments of the present invention, the first and second roll values (23, 23') and the first and second pitch values (26, 26') are equivalent to each other, such as when vessel (11) remains stationary and is not moved. When vessel (11) is not moved after the first roll and pitch values (23, 26) are measured, and in accordance with some embodiments, the first roll and pitch values (23, 26) can be used as the second roll and pitch values (23', 26), and measurement of the second roll and pitch values (23'. 26') is effectively achieved by measurement of the first roll and pitch values (23, 26).

In accordance with some embodiments, the roll values, including the first and second roll values, can extend over a wide range. With some further embodiments the roll values, including the first and second roll values, are determined relative to horizontal and can range from 0° to 90°, or from 0° to 45°, or from 0° to 30°, or from 0° to 20°, or from 0° to 15°, or from 0° to 10°, or from 0° to 5°, in each case inclusive of the recited values.

In accordance with some embodiments, the pitch values, including the first and second pitch values, can extend over a wide range. With some further embodiments the pitch values, including the first and second pitch values, are determined relative to horizontal and can range from 0° to 90°, or from 0° to 45°, or from 0° to 30°, or from 0° to 20°, or from 0° to 15°, or from 0° to 10°, or from 0° to 5°, in each case inclusive of the recited values.

The fluid within the vessel is, with some embodiments, a liquid at ambient pressure, and can be selected from any suitable liquid or combination of liquids. The fluid, with some embodiments, includes water. With some further embodiments, the fluid in the vessel is selected from city water, well water, lotic water, hydrofracture flowback water, hydrofracture production water, and combinations thereof. With some additional embodiments, the fluid is selected from gasoline (or petrol), diesel fuel, oil (including heating oil), and milk.

Fluid is added or removed from within the vessel, with some embodiments, by any appropriate methods, such as pumping, gravity, pressurizing the interior of the vessel (for purposes of removing fluid from the vessel), and/or forming a negative (or reduced) pressure within the vessel (for purposes of adding fluid to the vessel).

With some embodiments, removing at least a portion of the fluid from the vessel (including a portion of the fluid or substantially all of the fluid) includes introducing a gas at elevated pressure into an interior of the vessel. The gas, with some embodiments is selected from air, nitrogen, carbon dioxide, argon, or a combination thereof. The gas is introduced into the vessel under elevated pressure, with some embodiments, through one or more inlet conduits, such as inlet conduit (56), and the fluid within the vessel is removed from the vessel through one or more outlet conduits, such as outlet conduit (59). The elevated pressure of the gas is typically greater than the ambient pressure outside the vessel. With some embodiments, the elevated pressure of the gas that is introduced into the vessel is from 1 psi to 30 psi, or from 5 psi to 15 psi.

In accordance with some embodiments, one or more pumps and additional conduits (not shown) are in fluid communication with inlet conduit (56) and outlet conduit (59) and can be activated for purposes of adding fluid to the interior (38) of vessel (11) or removing fluid from the interior (38) of vessel (11), in accordance with art-recognized methods.

The method of the present invention, with some embodiments, further includes: (i) providing a computing device (62) that includes at least one input interface (65, 68, 69), at least one output interface (71), a database that includes the known interior dimensions of the vessel and the known interior total volume of the vessel, and a software program that calculates volume of fluid within the vessel; (ii) inputting into the input interface(s) (65, 68) of the computing device (62), the first surface level (20) of fluid (14) within the vessel (11), the first roll value (23) of the vessel, and the first pitch value (26) of the vessel; (iii) calculating with the software program the first volume of fluid within the vessel using the know interior dimensions of the vessel, the known interior total volume of the vessel, the first surface level (20) of fluid within the vessel, the first roll value (23) of the vessel, and the first pitch value (26) of the vessel. The method further includes, with some embodiments, (iv) inputting into the input interface(s) (65, 68) of the computing device (62), the second surface level (20') of fluid (14) within the vessel (11), the second roll value (23') of the vessel, and the second pitch value (26') of the vessel; and (v) calculating with the software program the second volume of fluid (14) within the vessel (11) using the know interior dimensions of the vessel, the known interior total volume of the vessel, the second surface level (20') of the fluid within the vessel, the second roll value (23') of the vessel, and the second pitch value (26') of the vessel. The method additionally includes, with some embodiments. (vi) comparing, with the software program, the first volume of fluid within the vessel and the second volume of fluid within the vessel, thereby determining the change in volume of fluid within the vessel.

With some embodiments, the computer program within the computing device (62) includes one or more routines, sub-routines, modules, and/or algorithms that calculate the first and second volumes of fluid within the vessel, compare the first and second volumes, and thereby determine the change in volume of fluid within the vessel. With some embodiments, computing device (62) includes a database including the interior dimensions and interior total volumes of vessels, which can be selected by a user, depending on the vessel to which fluid is being added to or removed from. The computer program, with some embodiments, includes one or more mathematical equations that serve to calculate the first and second fluid volumes using the known interior dimensions of the vessel, the known interior total volume of the vessel, the first and second surface levels of the fluid within the vessel (including the position from which fluid surface levels are measured), the first and second roll values of the vessel, and the first and second pitch values of the vessel. The mathematical equation(s) include, with some embodiments, one or more sets or sub-sets of triple integration equations (using Cartesian coordinates and/or polar coordinates). The mathematical equation(s) and algorithm(s) used to calculate the first and second fluid volumes within the vessel can be employed: (i) as one or more computer programs within the computer processor unit; and/or (ii) manually, such as by handwriting on paper.

In accordance with some embodiments, the vessel is a substantially cylindrical vessel, and the known interior dimensions of the vessel, and the known interior total volume of the vessel, are determined from: (a) the length and height of the substantially cylindrical vessel; and (b) the geometry of the end portions of the substantially cylindrical vessel, which are selected from, with some embodiments: (i) flanged or dished end(s); (ii) hemispherical end(s); (iii) semi-elliptical end(s); (iv) torispherical end(s); and (v) combinations thereof. With the known interior dimensions of the vessel and the known interior total volume of the vessel determined, one or more further calculations are performed, using the first and second surface levels of fluid within the vessel (including the position from which fluid surface levels are measured), the first and second roll values of the vessel, and the first and second pitch values of the vessel, to determine the first and second volumes of fluid within the vessel, and further determine the change in volume of fluid within the vessel.

With some embodiments of the present invention, an algorithm is used in conjunction with calculating and determining the first and second volumes of fluid within the vessel, and further determining the change in volume of fluid within the vessel. In accordance with some embodiments, the algorithm includes a plurality of scenarios (or cases) each having associated therewith a default volume determination or a separate set of equations and calculations. The algorithm, with some embodiments, includes six scenarios (or cases), which are summarized as follows with regard to a substantially cylindrical vessel, such as vessel (11) including fluid level detector (29), which is viewed orthogonally from the side with one end on the left and the other end on the right. With the first case, the fluid level is below a readable (or detectable) level of the fluid level detector (29), in which case the vessel (11) is considered to be empty (or substantially empty). With the second case, the fluid level is above a readable (or detectable) level of the fluid level detector (29), in which case the vessel (11) is considered to be full (or substantially full). With the third case, the vessel (11) is pitched up on the right, with the interior left end of vessel (11) full (or fully immersed with fluid) and the interior right side of vessel (11) empty (or free of contact with fluid), in which case a third case set of equations and calculations are performed (using the measured surface level of the fluid, roll value, and pitch value). With the fourth case, vessel (11) is pitched up on the right, with the interior left end of vessel (11) partially full (or partially immersed with fluid) and the interior right side of vessel (11) empty (or free of contact with fluid), in which case a fourth case set of equations and calculations are performed (using the measured surface level of the fluid, roll value, and pitch value). With a fifth case, vessel (11) is pitched up on the right, with the interior left end of vessel (11) full (or substantially immersed with fluid) and the interior right side of vessel (11) partially full (or less than substantially immersed with fluid), in which case a fifth case set of equations and calculations are performed (using the measured surface level of the fluid, roll value, and pitch value). With a sixth case, vessel (11) is level (0° pitch), or pitched up on the left, or pitched up on the right, with the interior left side of vessel (11) and the interior right side of vessel (11) each being partially full (or less than substantially immersed with fluid), in which case a sixth case set of equations and calculations are performed (using the measured surface level of the fluid, roll value, and pitch value).

The computing device (62), with some embodiments, has associated therewith a keyboard (89) which is connected electrically to an input interface (69) of the computing device (62) by at least one communicative connection (95). The computing device (62), with some further embodiments, has associated therewith a display (92), such as a video display, which is communicatively connected to an output interface (71) of the computing device (62) by at least one communicative connection (86).

The computing device (62), with some embodiments, is connected to a power source (98) by an electrical connection (101). The power source (98) can be selected from an electrical battery, an electrical grid, or a combination thereof.

Communication between each of the tilt sensor (41) and the fluid level detector (29), and the computing device (62), can be achieved by physical electrical connections and/or fiber optic connections, such as indicated by communicative connections (80) and (83), and/or by wireless connections/communication, such as radio-wave connections/communication, an example of which includes, but is not limited to, BLUETOOTH wireless connections/communication (not shown).

The computing device (62) as depicted in FIG. 2 is a desktop computer (or desktop computer processing unit) or portable computer (or portable computer processing unit). With some embodiments computing device (62) is a mobile (or cellular or smart) phone, not depicted, which is communicatively connected to tilt sensor (41) and fluid level detector (29) by radio-wave connections/communications, such as BLUETOOTH wireless connections/communications. With some further embodiments, when computing device (62) is a mobile (or cellular or smart) phone it is further communicatively connected to one or more remote computing devices (such as one or more remote computer servers—not shown) by radio-wave connections/communications, such as BLUETOOTH wireless connections/communications, which can optionally include communicative connections to one or more intermediate cell towers (not shown).

With some embodiments of the present invention, the vessel (11) and the base (17) are both stationary, and the base (17) is positioned over a surface (74) of the earth. With some embodiments, a pad or pad assembly (not shown) is interposed between the base (17) and the surface (74) of the earth, such as the truck (3) resides statically on a pad or pad assembly (not shown).

The vessel and base can be together positioned on or over any appropriate surface and/or further support. The vessel (11) and the base (17) are together positioned, with some embodiments: on a chassis (77) of a truck (3); or on a chassis of a semi-trailer (not shown). With some further embodiments, the vessel and the base are together positioned on a rail car (not shown). With some further embodiments, the vessel and the base are together positioned on a skid. With some additional embodiments, the base defines a skid.

The vessel can be fabricated from any appropriate material, such as, but not limited to, metals, ceramics, organic polymers (including thermoplastic and/or crosslinked organic polymers), inorganic polymers, and combinations thereof.

The vessel can have any suitable shape, such as spherical shapes, cylindrical shapes, and combinations thereof. With some embodiments, the vessel (11) is a substantially cylindrical vessel having a longitudinal axis that is substantially parallel with the axis (44) of the base (17), and/or the axis (50) of the inclinometer (41), and/or the axis (24) by which the roll value is determined.

The vessel can have a wide range of interior total volumes, such as known interior total volumes. With some embodiments, the known interior total volume of the vessel is from one gallon to 10,000 gallons (3.78 liters to 37,854 liters), from 500 gallons to 10,000 gallons (1893 liters to 37,854 liters), or from 800 gallons to 5000 gallons (3028 liters to 18,927 liters).

In further accordance with the present invention there is provided an apparatus (5) for determining a change in volume of fluid within a vessel (11). With non-limiting reference to FIG. 2, the apparatus (5), with some embodiments, includes: (a) a fluid level detector (29) that detects fluid levels within the vessel (11), wherein the vessel has known interior dimensions, has a known interior total volume, and the vessel is supported on a base (17); (b) a tilt sensor (41) having an x-y plane (50, 53), wherein the base (17) has an x-y plane (44, 47), and the tilt sensor is positioned such that the x-y plane (44, 47) of the base (17) and the x-y plane (50, 53) of the tilt sensor (41) are parallel to each other, the tilt sensor (41) providing a first roll value (23) of the vessel, a second roll value (23') of the vessel, a first pitch value (26) of the vessel, and a second pitch value (26') of the vessel; and (c) a computing device (62) comprising at least one input interface (65, 68), at least one output interface (71), a database comprising the known interior dimensions of the vessel and the known interior total volume of the vessel, and a software program that calculates volume of fluid within the vessel.

With the apparatus (5), and in accordance with some embodiments of the present invention, the fluid level detector (29) is communicatively connected (e.g., via communicative connection 83) to at least one input interface (e.g., 65) of the computing device (62), and the tilt sensor (41) is communicatively connected (e.g., via communicative connection 80) to at least one input interface (e.g., 68) of the computing device (62).

In accordance with some embodiments of the apparatus (5) of the present invention, a first surface level (20) of fluid (14) within the vessel (11) is communicated (e.g., via communicative connection 83) from the fluid level detector (29) to at least one input interface (e.g., 65) of the computing device (62), a first roll value (23) of the vessel is communicated (e.g., via communicative connection 80) from the tilt sensor (41) to at least one input interface (e.g., 68) of the computing device (62), and a first pitch value (26) is communicated (e.g., via communicative connection 80) from the tilt sensor (41) to at least one input interface (e.g., 68) of the computing device (62).

In accordance with some further embodiments of the apparatus (5) of the present invention, the software program calculates a first volume of fluid within the vessel using the know interior dimensions of the vessel, the known interior total volume of the vessel, the first surface level (20) of the fluid (14) within the vessel, the first roll value (23) of the vessel, and the first pitch value (26) of the vessel.

Fluid (14) is removed from the vessel (11), or fluid (14) is added to the vessel (11), in accordance with some embodiments of the apparatus (5) of the present invention.

In accordance with some additional embodiments of the apparatus (5) of the present invention, a second surface level (20') of fluid (14) within the vessel (11) is communicated (e.g., via communicative connection 83) from the fluid level detector (29) to at least one input interface (e.g., 65) of the computing device (62), a second roll value (23') of the vessel is communicated (e.g., via communicative connection 80) from the tilt sensor (41) to at least one input interface (e.g., 68) of the computing device (62), and a second pitch value (26') is communicated (e.g., via communicative connection 80) from the tilt sensor (41) to at least one input interface (e.g., 68) of the computing device (62).

In accordance with some additional embodiments of the apparatus (5) of the present invention, the software program calculates a second volume of fluid within the vessel using the know interior dimensions of the vessel, the known interior total volume of the vessel, the second surface level (20') of the fluid within the vessel, the second roll value (23') of the vessel, and the second pitch value (26') of the vessel.

In accordance with some further embodiments of the apparatus (5) of the present invention, with the software program, the first volume of fluid within the vessel and the second volume of fluid within the vessel are compared, and thereby the change in volume of fluid within the vessel is determined.

The present invention can be further characterized by one or more of the following non-limiting clauses.

Clause 1. A method of determining a change in volume of fluid within a vessel, comprising:
(a) providing a vessel having known interior dimensions, and having a known interior total volume, wherein said vessel is supported on a base;
(b) measuring a first surface level of fluid within said vessel;
(c) measuring a first roll value of said vessel;
(d) measuring a first pitch value of said vessel;
(e) calculating a first volume of fluid within said vessel using the know interior dimensions of said vessel, said known interior total volume of said vessel, said first surface level of fluid within said vessel, said first roll value of said vessel, and said first pitch value of said vessel;
(f) adding fluid to said vessel or removing fluid from said vessel;
(g) measuring a second surface level of fluid within said vessel;
(h) measuring a second roll value of said vessel;
(i) measuring a second pitch value of said vessel;
(j) calculating a second volume of fluid within said vessel using the know interior dimensions of said vessel, said known interior total volume of said vessel, said second surface level of fluid within said vessel, said second roll value of said vessel, and said second pitch value of said vessel; and
(k) comparing said first volume of fluid within said vessel and said second volume of fluid within said vessel, thereby determining a change in volume of fluid within said vessel.

Clause 2. The method of clause 1, wherein said first surface level of fluid within said vessel, and said second surface level of fluid within said vessel, are each independently measured with a fluid level detector selected from a contact fluid level detector, a non-contact fluid level detector, or combinations thereof.

Clause 3. The method of clause 2, wherein said fluid level detector is a non-contact fluid level detector selected from a non-contact microwave fluid level detector.

Clause 4. The method of clause 1, wherein said first roll value of said vessel, said first pitch value of said vessel, said second roll value of said vessel, and said second pitch value of said vessel, are each measured with a tilt sensor.

Clause 5. The method of claim 4, wherein said base has an x-y plane, and said tilt sensor has an x-y plane, and said x-y plane of said base and said x-y plane of said tilt sensor are parallel to each other.

Clause 6. The method of clauses 4 or 5, wherein said tilt sensor is attached to said base.

Clause 7. The method of any one of clauses 4 to 6, wherein said tilt sensor is selected from an inclinometer or an accelerometer.

Clause 8. The method of any one of clauses 1 to 7, wherein at least a portion of fluid is removed from said vessel, and removing at least a portion of fluid from said vessel comprises introducing a gas at elevated pressure into an interior of said vessel.

Clause 9. The method of any one of clauses 1 to 8 further comprising,
(i) providing a computing device comprising at least one input interface, at least one output interface, a database comprising said known interior dimensions of said vessel and said known interior total volume of said vessel, and a software program that calculates volume of fluid within said vessel;
(ii) inputting into said input interface of said computing device,
said first surface level of fluid within said vessel,
said first roll value of said vessel, and
said first pitch value of said vessel, (iii) calculating with said software program said first volume of fluid within said vessel using the know interior dimensions of said vessel, said known interior total volume of said vessel, said first surface level of fluid within said vessel, said first roll value of said vessel, and said first pitch value of said vessel;

(iv) inputting into said input interface of said computing device,
said second surface level of fluid within said vessel, said second roll value of said vessel, and
said second pitch value of said vessel, (v) calculating with said software program said second volume of fluid within said vessel using the know interior dimensions of said vessel, said known interior total volume of said vessel, said second surface level of said fluid within said vessel, said second roll value of said vessel, and said second pitch value of said vessel; and (vi) comparing, with said software program, said first volume of fluid within said vessel and said second volume of fluid within said vessel, thereby determining said change in volume of fluid within said vessel.

Clause 10. The method of any one of clauses 1 to 9, wherein said vessel and said base are both stationary, and said base is positioned over a surface of the earth.

Clause 11. The method of any one of clauses 1 to 10, wherein said vessel and said base are together positioned,
on a chassis of a truck, or
on a chassis of a semi-trailer.

Clause 12. The method of any one of clauses 1 to 11, wherein said known interior total volume of said vessel is from 500 gallons to 10,000 gallons.

Clause 13. An apparatus for determining a change in volume of fluid within a vessel, said apparatus comprising:
(a) a fluid level detector that detects fluid levels within said vessel, wherein said vessel has known interior dimensions, has a known interior total volume, and said vessel is supported on a base;
(b) a tilt sensor having an x-y plane, wherein said base has an x-y plane, and said tilt sensor is positioned such that said x-y plane of said base and said x-y plane of said tilt sensor are parallel to each other, said tilt sensor providing a roll value of said vessel and a pitch value of said vessel; and
(c) a computing device comprising at least one input interface, at least one output interface, a database comprising said known interior dimensions of said vessel and said known interior total volume of said vessel, and a software program that calculates volume of fluid within said vessel;
wherein said fluid level detector is communicatively connected to at least one input interface of said computing device, and said tilt sensor is communicatively connected to at least one input interface of said computing device,
wherein a first surface level of fluid within said vessel is communicated from said fluid level detector to at least one input interface of said computing device, an first roll value of said vessel is communicated from said tilt sensor to at least one input interface of said computing device, and a first pitch value is communicated from said tilt sensor to at least one input interface of said computing device,
wherein said software program calculates a first volume of fluid within said vessel using the know interior dimensions of said vessel, said known interior total volume of said vessel, said First surface level of said fluid within said vessel, said first roll value of said vessel, and said first pitch value of said vessel, wherein fluid is removed from said vessel, or fluid is added to said vessel, wherein a second surface level of fluid within said vessel is communicated from said fluid level detector to at least one input interface of said computing device, a second roll value of said vessel is communicated from said tilt sensor to at least one input interface of said computing device, and a second pitch value is communicated from said tilt sensor to at least one input interface of said computing device, wherein said software program calculates a second volume of fluid within said vessel using the know interior dimensions of said vessel, said known interior total volume of said vessel, said second surface level of said fluid within said vessel, said second roll value of said vessel, and said second pitch value of said vessel, and wherein, with said software program, said first volume of fluid within said vessel and said second volume of fluid within said vessel are compared, and thereby said change in volume of fluid within said vessel is determined.

Clause 14. The apparatus of clause 13, wherein said first surface level of fluid within said vessel, and said second surface level of fluid within said vessel, are each measured with a fluid level detector selected from a contact fluid level detector, a non-contact fluid level detector, or combinations thereof.

Clause 15. The apparatus of clause 14, wherein said fluid level detector is a non-contact fluid level detector selected from a non-contact microwave fluid level detector.

Clause 16. The apparatus of any one of clauses 13 to 15, wherein said tilt sensor is selected from an inclinometer and an accelerometer.

Clause 17. The apparatus of any one of clauses 13 to 16, wherein said tilt sensor is attached to said base.

The present invention has been described with reference to specific details of particular embodiments thereof. It is not intended that such details be regarded as limitations upon the scope of the invention except insofar as to the extent that they are included in the accompanying claims.

What is claimed is:

1. A method of determining a change in volume of fluid within a vessel having a substantially cylindrical shape, the vessel having known interior dimensions, and the vessel having a known interior total volume, the method comprising:
(a) measuring a first surface level of fluid within said vessel;
(b) measuring a first roll value of said vessel;
(c) measuring a first pitch value of said vessel;
(d) calculating a first volume of fluid within said vessel using the known interior dimensions of said vessel, said known interior total volume of said vessel, said first surface level of fluid within said vessel, said first roll value of said vessel, and said first pitch value of said vessel;
(e) adding fluid to said vessel or removing fluid from said vessel;
(f) measuring a second surface level of fluid within said vessel;
(g) measuring a second roll value of said vessel;
(h) measuring a second pitch value of said vessel;
(i) calculating a second volume of fluid within said vessel using the known interior dimensions of said vessel, said known interior total volume of said vessel, said second surface level of fluid within said vessel, said second roll value of said vessel, and said second pitch value of said vessel; and (j) comparing said first volume of fluid within said vessel and said second volume of fluid within said vessel, thereby determining a change in volume of fluid within said vessel.

2. The method of claim 1, wherein said first surface level of fluid within said vessel, and said second surface level of fluid within said vessel, are each independently measured with a fluid level detector selected from a contact fluid level detector, a non-contact fluid level detector, and/or a combination thereof.

3. The method of claim 2, wherein said fluid level detector is a non-contact fluid level detector comprising a non-contact microwave fluid level detector.

4. The method of claim 1, wherein said first roll value of said vessel, said first pitch value of said vessel, said second roll value of said vessel, and said second pitch value of said vessel, are each measured with a tilt sensor.

5. The method of claim 4, wherein said base has an x-y plane, and said tilt sensor has an x-y plane, and said x-y plane of said base and said x-y plane of said tilt sensor are parallel to each other.

6. The method of claim 5, further comprising the vessel supported on a base and said tilt sensor is attached to said base.

7. The method of claim 4, wherein said tilt sensor is selected from an inclinometer or an accelerometer.

8. The method of claim 1, wherein at least a portion of fluid is removed from said vessel, and removing at least a portion of fluid from said vessel comprises introducing a gas at elevated pressure into an interior of said vessel.

9. The method of claim 1, further comprising, (k) providing a computing device comprising at least one input interface, at least one output interface, a database comprising said known interior dimensions of said vessel and said known interior total volume of said vessel, and a software program that calculates volume of fluid within said vessel;

(l) inputting, by the computing device, into said input interface of said computing device, said first surface level of fluid within said vessel, said first roll value of said vessel, and said first pitch value of said vessel, (m) calculating, by the computing device and with said software program, said first volume of fluid within said vessel using the known interior dimensions of said vessel, said known interior total volume of said vessel, said first surface level of fluid within said vessel, said first roll value of said vessel, and said first pitch value of said vessel;

(n) inputting, by the computing device, into said input interface of said computing device, said second surface level of fluid within said vessel, said second roll value of said vessel, and said second pitch value of said vessel;

(o) calculating, by the computing device and with said software program, said second volume of fluid within said vessel using the known interior dimensions of said vessel, said known interior total volume of said vessel, said second surface level of said fluid within said vessel, said second roll value of said vessel, and said second pitch value of said vessel; and (p) comparing, by the computing device and with said software program, said first volume of fluid within said vessel and said second volume of fluid within said vessel, thereby determining said change in volume of fluid within said vessel.

10. The method of claim 1, further comprising:
supporting said vessel on a base; and
wherein said vessel and said base are both stationary, and said base is positioned over a surface of the earth.

11. The method of claim 1, further comprising:
supporting said vessel on a base; and
wherein said vessel and said base are positioned on a chassis of a truck, or on a chassis of a semi-trailer.

12. The method of claim 1, wherein said known interior total volume of said vessel is from 500 gallons to 10,000 gallons.

13. An apparatus for determining a change in volume of fluid within a vessel having a substantially cylindrical shape, wherein said vessel has known interior dimensions, and said vessel has a known interior total volume, said apparatus comprising:

(a) a fluid level detector that detects fluid levels within said vessel, (b) a tilt sensor having an x-y plane, wherein said base has an x-y plane, and said tilt sensor is positioned such that said x-y plane of said base and said x-y plane of said tilt sensor are parallel to each other, said tilt sensor providing a roll value of said vessel and a pitch value of said vessel; and (c) a computing device comprising at least one input interface programmed for communicating with a database comprising said known interior dimensions of said vessel and said known interior total volume of said vessel, and a software program programmed for calculating volume of fluid within said vessel;

wherein said fluid level detector is communicatively connected to at least one input interface of said computing device, and said tilt sensor is communicatively connected to at least one input interface of said computing device;

the computing device is further programmed for communicating:
a first surface level of fluid within said vessel from said fluid level detector to at least one input interface of said computing device,
a first roll value of said vessel from said tilt sensor to at least one input interface of said computing device, and
a first pitch value from said tilt sensor to at least one input interface of said computing device;

wherein the fluid level detector is configured for communicating a second surface level of fluid within said vessel from said fluid level detector to at least one input interface of said computing device;

wherein the tilt sensor is configured for communicating:
a second roll value of said vessel from said tilt sensor to at least one input interface of said computing device, and
a second pitch value from said tilt sensor to at least one input interface of said computing device; and wherein said software program is programmed for:
calculating a first volume of fluid within said vessel using the known interior dimensions of said vessel, said known interior total volume of said vessel, said first surface level of said fluid within said vessel, said first roll value of said vessel, and said first pitch value of said vessel,
calculating a second volume of fluid within said vessel using the known interior dimensions of said vessel, said known interior total volume of said vessel, said second surface level of said fluid within said vessel, said second roll value of said vessel, and said second pitch value of said vessel, comparing said first volume of fluid within said vessel and said second volume of fluid within said vessel, and determining said change in volume of fluid within said vessel.

14. The apparatus of claim 13, further comprising the fluid level detector selected from a contact fluid level detector, a non-contact fluid level detector, and/or a combination thereof.

15. The apparatus of claim 13, wherein said tilt sensor is selected from an inclinometer or an accelerometer.

* * * * *